United States Patent
Sacripante et al.

(10) Patent No.: US 6,329,446 B1
(45) Date of Patent: Dec. 11, 2001

(54) INK COMPOSITION

(75) Inventors: Guerino G. Sacripante, Oakville (CA); Garland J. Nichols, Ontario, NY (US); Elizabeth A. Kneisel; Chieh-Min Cheng, both of Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/869,962

(22) Filed: Jun. 5, 1997

(51) Int. Cl.[7] .................................................. C09D 5/00
(52) U.S. Cl. .................. 523/161; 260/DIG. 38; 524/458; 524/460; 106/31.25; 106/31.28
(58) Field of Search .................. 523/161; 260/DIG. 38; 524/458, 460; 106/31.25, 31.28

(56) References Cited

U.S. PATENT DOCUMENTS

| | | | |
|---|---|---|---|
| 4,463,359 | 7/1984 | Ayata et al. | 347/56 |
| 5,207,825 | 5/1993 | Schwarz, Jr. | 106/31.29 |
| 5,223,026 | 6/1993 | Schwarz, Jr. | 106/31.43 |
| 5,324,349 * | 6/1994 | Suno et al. | 106/25 R |
| 5,328,504 | 7/1994 | Ohnishi | 106/20 D |
| 5,679,724 * | 10/1997 | Sacripante et al. | 523/161 |

FOREIGN PATENT DOCUMENTS

| | | | |
|---|---|---|---|
| 2175012 * | 10/1996 | (CA) . | |
| 0 412 548 A | 2/1991 | (EP) . | |
| 0 739 959 A | 10/1996 | (EP) . | |

* cited by examiner

*Primary Examiner*—Terrel Morris
(74) *Attorney, Agent, or Firm*—E. O. Palazzo

(57) ABSTRACT

An ink comprised of a vehicle, colorant, and resin emulsion, and wherein the resin emulsion contains water, surfactant, resin particles and solubilized resin obtained from the polymerization of a mixture of olefinic monomers, and wherein at least one of the olefinic monomers is an acid.

31 Claims, No Drawings

INK COMPOSITION

PENDING APPLICATIONS

Illustrated in copending application, U.S. Ser. No. 828,850, the disclosure of which is totally incorporated herein by reference, is ink with separated, or dissociated resin and pigment particles.

BACKGROUND OF THE INVENTION

The present invention is generally directed to aqueous ink compositions. More specifically, the present invention is directed to colored, especially pigmented, aqueous ink compositions particularly suitable for use in ink jet printing processes, and especially thermal ink jet processes, and wherein the inks enable images with excellent smear resistant characteristics. Moreover, with the inks of the present invention paper curl is minimized and image smearing is minimal, or avoided. In embodiments, the present invention relates to imaging processes with ink jet inks comprised of water, pigment, and resin emulsion particles. Further, images developed with the inks of the present invention in embodiments enable ink jet prints of excellent resolution, acceptable density, excellent waterfastness, minimum or very low showthrough, and excellent MFLEN.

PRIOR ART

Ink jet printing can be considered a non-impact method that produces droplets of ink that are deposited on a substrate, such as paper or transparent film, in response to an electronic digital signal. Thermal or bubble jet drop-on-demand ink jet printers have found broad application as output for personal computers in the office and the home In existing thermal ink jet printing, the printhead typically comprises one or more ink jet ejectors, such as disclosed in U.S. Pat. No. 4,463,359, the disclosure of which is totally incorporated herein by reference, each ejector including a channel communicating with an ink supply chamber, or manifold, at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. This is a very temporary phenomenon, and the ink is quickly propelled toward a print sheet. As the bubble begins to collapse, the ink still in the channel between the nozzle and bubble starts to move toward the collapsing bubble, causing a volumetric contraction of the ink at the nozzle, and resulting in the separation from the nozzle of the bulging ink as a droplet. The feed of additional ink provides the momentum and velocity for propelling the droplet towards a print sheet, such as a piece of paper. Since the droplet of ink is emitted only when the resistor is actuated, this type of thermal ink jet printing is known as "drop-on-demand" printing. Other types of ink jet printing, such as continuous-stream or acoustic, are also known.

In a single-color ink jet printing apparatus, the printhead typically comprises a linear array of ejectors, and the printhead is moved relative to the surface of the print sheet, either by moving the print sheet relative to a stationary printhead, or vice-versa, or both. In some types of apparatus, a relatively small printhead moves across a print sheet numerous times in swathes, much like a typewriter. Alternatively, a printhead, which consists of an array of ejectors and extends the full width of the print sheet, may be passed once down the print sheet to give full-page images in what is known as a "full-width array" (FWA) printer. When the printhead and the print sheet are moved relative to each other, imagewise digital data is used to selectively activate the thermal energy generators in the printhead over time so that the desired image will be created on the print sheet.

With the demand for higher resolution printers, the nozzles in ink jet printers are decreasing in size. Nozzle openings are typically about 50 to 80 micrometers in width or diameter for 300 spi printers. With the advent of 600 spi printers, these nozzle openings are typically about 10 to about 40 micrometers in width or diameter. These small dimensions require inks that do not plug or minimize plugging of the small openings.

Therefore, an important requirement for an ink jet ink is the ability of the ink to be stable with minimal or no settling, the ability of the ink to remain in a fluid condition in a printhead opening an exposure to air, and moreover, wherein when the inks are selected for ink jet printing there is minimized paper curl, or wherein paper curl can be controlled.

Another important measured property for an ink jet ink is the latency or decap time, which is the length of time over which an ink remains fluid in a printhead opening or nozzle when exposed to air and, therefore, capable of firing a drop of ink at its intended target. Latency is the maximum idling times allowed for ink to be jetted by a printer with a speed equal to or greater than 5 m/s (equivalent to an ink traveling a distance of 0.5 millimeter in less than 100 $\mu$s) without a failure. This test is operated with the printhead or nozzles uncovered or decapped, and generally at a relative humidity of 15 percent. The time interval is the longest length of time that the printhead, uncovered, will still fire a specified drop without drop displacement or loss of density. The longer the latency time rating, the more desirable the ink. The inks of the present invention possess many of these characteristics in embodiments thereof.

Moreover, an important requirement for ink jet inks, especially for pigment, such as carbon black, based inks, is for the pigment dispersion to remain substantially stable throughout the life of the ink jet cartridge. Dye-based ink jet inks can suffer from deficiencies in waterfastness, smear resistance and lightfastness after being printed on various substrates. Pigments provide an image, on a wide variety of substrates, having high optical density with high waterfastness, smear resistance and lightfastness. Therefore, pigments are a preferred alternative to dyes, provided the pigment dispersions can be made stable to prevent flocculation and/or aggregation and settling. Some cosolvents that function as clogging inhibitors cause destabilization of pigment dispersions and, therefore, cannot be used in pigmented inks.

There is thus a need for aqueous ink compositions that can be utilized in high resolution ink jet printers. Additionally, there is a need for pigmented inks that provide high latency and also remain stable throughout the life of the ink jet cartridge. There is also a need for pigmented inks that provide high optical density in a single application or pass. More importantly, there is a need for ink jet inks wherein paper curl, and/or image smearing can be eliminated or minimized when such inks are selected for ink jet printing processes.

SUMMARY OF THE INVENTION

The present invention relates to an aqueous ink jet ink composition comprising water, colored, especially pigment, particles, and an ink smear reducing additive comprised of a certain latex, that is resin emulsion. More specifically, the present invention relates to ink additives comprised of a resin emulsion comprised of first resin particles, and solubilized resin derived from the polymerization in water of an olefinic acid, such as acrylic acid or methacrylic acid, and an olefinic (meth)acrylate, such as methyl methacrylate, benzyl methacrylate and polyethyleneglycol methacrylate, and wherein the resin possesses, for example, a number average molecular weight of from about 1,000 grams per mole to about 15,000 grams per mole, and the weight average molecular weight thereof is from about 1,500 grams per mole to about 40,000 grams per mole. The resin emulsion is preferably comprised of from about 60 to about 99 weight percent of resin particles, of average diameter of from about 30 nanometers to about 300 nanometers, and from about 2 to about 40 weight percent of solubilized resin. Both the resin particles and solubilized resin can be generated from a free radical type process in water, and wherein one of the monomers is water soluble, such as an acrylic acid or methacrylic acid, and the other monomer(s), or second monomer in embodiments, possess low solubility in water, such as from about 0.05 to about 2 percent soluble in water, such as for example an alkyl acrylate or alkyl methacrylate or polyoxyalkylene(meth)acrylate. The free radical initiator utilized is generally an emulsion type initiator, such as a persulfate like potassium or ammonium persulfate, and chain transfer agents are utilized to adjust the molecular weight of the resin and for adjusting the resin particle to solubilized resin ratio. Chain transfer agents selected include alkylthiol such as dodecanethiol, halogenated carbons such as carbon tetrabromide, or preferably a combination of alkylthiol and halogenated carbon. Surfactants can also be incorporated into the resin emulsion such as anionic, cationic and nonionic resin. Generally, the olefinic acidic monomer utilized, such as acrylic acid or methacrylic acid, is from about 5 to about 20 weight percent of the resins, the olefinic alkyl(meth)acrylate is from about 40 to about 60 percent by weight of the resins, and the polyethyleneglycol methacrylate, or more generally a low molecular weight polyethylene glycol capped with a methacrylate or acrylate is from about 0 to about 20 percent by weight of the resins.

Preferably, the resin emulsion is comprised of about 90 to about 97 weight percent of first resin particles, and from about 3 to about 10 weight percent of second water soluble resin particles, and wherein both resin particle and solubilized resin are derived from a mixture of olefinic monomers such as about 10 percent by weight of methacrylic acid, 60 percent by weight of benzyl methacrylate and 30 percent by weight of polyethyleneoxide-methacrylate of an average molecular weight of from about 346 grams per mole. Although both the resin particles and solubilized resin are derived from the same monomers, the monomer may be different in the resin particles as compared to the solubilized resin. More specifically, it is believed that the solubilized resin contains more acidic monomer than the latex particles.

Embodiments of the present invention include an ink comprised of a vehicle, colorant, and resin emulsion, and wherein the resin emulsion contains water, surfactant, resin particles and solubilized resin obtained from the polymerization of a mixture of olefinic monomers, and wherein at least one of the olefinic monomers is an acid; wherein the alkyl acrylate or alkyl methacrylate is methyl acrylate, methyl methacrylate, ethyl acrylate, ethyl methacrylate, propyl acrylate, propyl methacrylate, butyl acrylate, butyl methacrylate, hexyl acrylate, hexyl methacrylate, pentyl acrylate, pentyl methacrylate, heptyl acrylate, heptyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate, dodecyl acrylate, or dodecyl methacrylate; wherein the polyoxyalkylene acrylate or methacrylate is of the formula

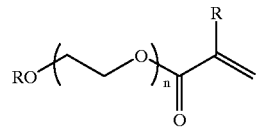

wherein R is hydrogen, or alkyl with from about 1 to about 6 carbon atoms, and n is a number of from about 2 to about 100; and wherein the surfactant is sodium dodecylbenzene sulfonate, polyethylene oxide, polyethylene oxide nonyl phenyl ether, tetraalkyl ammonium chloride, or sodium naphthalene sulfonate selected in an amount of from about 0.005 to about 20 weight percent of the resin.

In one specific embodiment, the resin emulsion is prepared by charging a one liter kettle equipped with a mechanical stirrer with from about 240 to about 260 grams of water, 1.0 to about 3.0 grams of sodium dodecylbenzene sulfonate obtained from Rhone-Poulenc as Rhodacal Ds-10, and from about 1.5 to about 2.5 grams of Triton X-100 (alkylphenoxypolyethanol) available from Aldrich Chemicals. This mixture is then stirred for about 2 hours at about 100 to about 200 revolutions per minute. To this solution is then added about 1.5 to about 2.5 grams of ammonium persulfate, followed by the addition of an organic mixture containing from about 25 to about 30 grams of methacrylic acid, 60 to about 70 grams of benzyl methacrylate, 20 to about 30 grams of polyethyleneglycol methacrylate with a molecular weight of 246 grams per mole, about 0 to about 6 grams of dodecanethiol, and from about 0 to about 5 grams of carbon tetrabromide. The mixture is then heated to about 70 to 80° C. (Centigrade) for a duration of, for example, from about 3 to about 16 hours. The product was then cooled to room temperature, and a sample (about 10 grams) is freeze dried and analyzed by GPC with a resin, a number average molecular of about 5,000 to about 90,000, a weight average molecular weight of about 2,000 to about 100,000 grams per mole and a polydispersity of about 2.0 to about 5.

Also, the present invention relates to a high resolution printing process comprising applying the invention ink composition in imagewise fashion to a substrate. The ink possesses a latency of at least 20 seconds in a printer having at least one nozzle of a channel width or diameter ranging from 10 to about 40 microns, and wherein the paper curl is minimized or eliminated.

Important embodiments of the present invention include an imaging process which comprises the development of an image with an aqueous ink jet ink composition comprised of pigment, water, and resin emulsion illustrated herein present in an amount of from about 25 to about 50 weight percent; an imaging process which comprises the development of an image with the aqueous ink jet ink composition and wherein images with minimal curling and minimal smearing are obtained; a high resolution printing process comprising applying in imagewise fashion to a substrate in a printer having at least one nozzle of a channel width or diameter ranging from about 10 to about 4 microns the aqueous ink jet ink composition; a process for reducing or eliminating paper curl in a xerographic ink jet apparatus which comprises generating images in the apparatus and developing the images with the aqueous ink jet ink composition.

Imaging processes of the present invention in embodiments thereof possess a number of advantages including excellent waterfastness, lightfastness, low product cost, high image resolution, excellent print quality on a variety of substrates, excellent jetting capability with high drop velocity, longer latency, larger drop mass or drop volume which provides optimal optical density in a single pass, high frequency response which allows for high speed printing, excellent printhead recoverability and maintainability, excellent ink stability, minimal ink and pigment settling, minimal or no printhead kogation, and more importantly, wherein the inks when selected for ink jet processes enable the minimization of paper curl and wherein smearing is avoided or minimized.

The liquid vehicle of the inks employed for the process of the present invention include water, or may comprise a mixture of water and a miscible organic component, such as glycols like thioglycols, ethylene glycol, propylene glycol, diethylene glycols, glycerine, dipropylene glycols, polyethylene glycols, polypropylene glycols, amides, ethers, carboxylic acids, alcohols, organosulfides, organosulfoxides, sulfones, dimethylsulfoxide, sulfolane, alcohol derivatives, carbitol, butyl carbitol, cellusolve, ether derivatives, amino alcohols, ketones, and other water miscible materials, and mixtures thereof.

When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside these ranges. The non-water component of the liquid vehicle generally serves as a humectant which has a boiling point higher than that of water (100° C.). The colorant, especially pigment dispersion can be mixed with different humectants or solvents for ink jet inks including ethyleneglycol, diethyleneglycol, propyleneglycol, dipropylene glycol, polyethyleneglycols, polypropyleneglycols, glycerine, trimethylolpropane, 1,5-pentanediols, 1,6-hexanediols, diols and triols containing 2 to 10 carbons, sulfoxides (for example, dimethylsulfoxide, alkylphenyl sulfoxides, etc.), sulfones (for example sulfolane, dialkyl sulfones, alkyl phenyl sulfones, and the like), amides (for example N,N-dialkyl amides, N,N-alkyl phenyl amides, N-methylpyrrolidinone, N-cyclohexylpyrrolidinone, N,N-diethyltoluamide, 2-pyrrolidinone, ethers such as alkyl ether derivatives of alcohol, etherdiols, and ethertriols including butylcarbitol, alkyl polyethyleneglycols, and the like), urea, betaine, and the thio(sulfur) derivatives of the aforementioned materials (for example, thioethyleneglycol, trithioethyleneglycol, and the like). Desired penetrants, water soluble polymers, pH buffer, biocides, chelating agents (EDTA and the like), and optional additives can also be used. In the inks employed for the process of the present invention, the liquid vehicle is generally present in an amount of from about 50 to about 99.5 percent by weight, preferably about 55 to about 95 percent by weight, and more preferably from about 60 to about 90 percent by weight, although the amount can be outside these ranges.

Examples of surfactants include the alcohol surfactants illustrated herein, and more specifically, a mixture of secondary alcohols reacted with ethylene oxide, such Tergitol 15-S series surfactants available from Union Carbide, polyethylene oxide, alkylphenoxy-polyethylene oxide, such as Triton X-100 available from Aldrich Chemical Company, polyethylene oxide nonylphenyl ether available as IGEPAL from Aldrich Chemical Company, or as ANTAROX from Rhone Poulenc. The surfactants are utilized in various effective amounts, such as for example from about 0.1 to about 5 percent, and from 1 to about 3 weight percent by weight of the ink.

The colorant for the ink compositions of the present invention is preferably a pigment in an amount, for example, of from about 1 to about 5 weight percent. The pigment can be black, cyan, magenta, yellow, red, blue, green, brown, mixtures thereof, and the like, and is preferably the carbon black Levanyl, carbon black product obtained from Bayer, or similar carbon blacks obtained from Cabot Corporation. Examples of suitable black pigments include various carbon blacks such as channel black, furnace black, lamp black, and the like. Colored pigments include red, green, blue, brown, magenta, cyan, and yellow particles, as well as mixtures thereof. Illustrative examples of magenta pigments include 2,9-dimethyl-substituted quinacridone and anthraquinone, identified in the Color Index as CI 60710, CI Solvent Red 19, and the like. Illustrative examples of suitable cyan pigments include copper tetra-4-(octadecyl sulfonamido) phthalocyanine, X-copper phthalocyanine pigment, listed in the Color Index as CI 74160, CI Pigment Blue, and Anthradanthrene Blue, identified in the Color Index as CI 69810, Special Blue X-2137, and the like. Illustrative examples of yellow pigments that can be selected include diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, Permanent Yellow FGL, and the like. The preferable pigment dispersions include carbon blacks, such as Hostafine Black (T and TS), Sunsperse 9303, Cabot's CABOJET Series, and Levanyl Black A-SF carbon black products from Cabot Corporation, such as CABOJET 300, is preferred.

Preferably, the colorant, preferably pigment, particle size is small to enable a stable colloidal suspension of the particles in the liquid vehicle and to prevent clogging of the ink channels when the ink is used in a thermal ink jet printer. Preferred particle average diameters determined using a light scattering analyzer, such as a Coulter N4 plus light scattering analyzer, are generally from about 0.001 to about 5 microns, and more preferably from about 0.01 to about 3 microns in volume average diameter, although the particle size can be outside these ranges. A more preferred pigment particle size includes particles having at least 70 percent of the particles being below 0.1 micron with no particles being greater than 1.0 micron (measured on a Hodaka CAPA 700 Particle Size Analyzer). More preferably, the pigment particle size includes particles having at least 90 percent of the particles being below 0.1 micron with no particles being greater than 1.0 micron.

The pigment is present in the ink composition in various effective amounts and generally from about 1 to about 20 percent by weight, preferably from about 2 to about 10 percent by weight, more preferably from about 2.5 to about 9 percent by weight although the amount can be outside of these ranges.

Polymeric additives can also be added to the inks employed in the process of the present invention to enhance the viscosity of the ink, including water soluble polymers such as Gum Arabic, polyacrylate salts, polymethacrylate salts, polyvinyl alcohols, hydroxypropylcellulose, hydroxyethylcellulose, polyvinylpyrrolidinone, polyvinylether, polyethyleneimines derivatized with polyethylene oxide and polypropylene oxide, such as the DISCOLE® series available from DKS International, Tokyo, Japan, the JEFFAMINE® series available from Texaco, Bellaire, Tex., and the like. Polymeric additives may be present in the ink of the present invention in amounts of from 0 to about 10 percent by weight, preferably from about 0.001 to about 8 percent by weight, and more preferably from about 0.01 to about 5 percent by weight, although the amount can be outside these ranges.

Further optional additives to the inks employed in the process of the present invention include biocides, such as DOWICIL 150, 200, and 75, benzoate salts, sorbate salts, and the like, present in an amount of from 0 to about 10 percent by weight, preferably from about 0.001 to about 8 percent by weight, and more preferably from about 0.01 to about 4.0 percent by weight, although the amount can be outside these ranges, penetration control additives such as N-methylpyrrolidinone, sulfoxides, ketones, lactones, esters, alcohols, butyl carbitol, benzyl alcohol, cyclohexylpyrrolidinone, 1,2-hexanediol, and the like, present in an amount of from 0 to about 50 percent by weight, and preferably from about 5 to about 40 percent by weight, although the amount can be outside these ranges, pH controlling agents, such as acids or, bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges, or the like.

Other examples of suitable ink additives include those illustrated in U.S. Pat. Nos. 5,223,026 and 5,207,825, the disclosure of each of which is totally incorporated herein by reference.

Aqueous ink compositions according to the present invention may also be provided by mixing the formed inks with humectants, and other ink additives. The mixing can be done by various methods including homogenizing, sonification, microfluidization, mechanical mixing, magnetic stirring, high speed jetting, and the like.

The dispersed pigment can be used as an ink as is, but preferably the thoroughly mixed pigment ink mixture is first centrifuged by a batch process or a continuous process utilizing commercially available equipment, such as bottle centrifuges, preparative ultracentrifuges, analytical ultracentrifuges, zonal centrifuges, tubular centrifuges, disk centrifuges, continuous conveyor-discharge centrifuges, basket centrifuges, liquid cyclones, and the like to remove large pigment particles from the ink. Centrifuging should be conducted for a time sufficient to remove large size particles and at a rate of about 4,000 to 8,000 rpm. The continuous centrifuge process is very useful in the commercial production of large quantities of pigment ink for the separation of large pigment particles from the ink. The ink is also preferably subjected to a filtration process which utilizes various commercial filtration media including cartridges constructed from nylon, polyester, TEFLON®, polysulfone, polyethylene, glass fiber and other suitable polymeric materials; membranes; porous ceramic media; cloth; and the like. The filter should be of a size to remove particles greater than 3 $\mu$m in size, preferably greater than 1.2 $\mu$m in size, and most preferably greater than 1 $\mu$m in size. Any suitable filtration method, such as continuous and/or batch filtration methods, may be used. Continuous filtration methods are preferred for large scale production of pigment inks. Inks, which have been centrifuged and filtered so as to preferably remove particles greater than 1 $\mu$m in size from the ink, are suitable for use as ink jet inks because of their ability to not clog the ink jet and their long latency and jetting stability. The inks of the present invention possess excellent latency. Generally, the inks possess a latency of at least 20 seconds, more generally on the order of 30 seconds to greater than 1,000 seconds, with a minimum latency of at least 30 seconds being preferred.

EVALUATIONS

The properties of the following prepared ink compositions were evaluated as follows:

A) Physical Properties:

The viscosity of the ink was measured at 25° C. using a Brookfield Model DV-11 viscometer.

The surface tension of the ink was measured at 25° C. using a Kruss model K10T plate tensiometer.

The pH was measured at 25° C. using a Corning model 345 pH meter.

B) Dry Smear Resistance:

The inks were placed in an ink jet printer HP850C (Hewlett Packard). After an image was printed, the image was allowed to stand, or remain at room temperature, about 25° C. throughout, for 24 hours prior to evaluation. The optical density of the solid area was measured prior to smear testing using a densitometer (X-Rite 428). The images were printed on several media such as Xerox Courtland 4024DP and Image Series LX paper. A clean sheet of the matching paper was placed on top of the solid area image. Using a rub tester (Manufactured by Testing Machines Inc.), a 4 pound weight was placed on top of the covered image. At a speed of 85 rubs per minute, the image was subjected to 50 rubs at 25° C. and 50 percent RH. The area adjacent to the solid area image was measured using the densitometer.

Wet Smear Resistance:

The inks were placed in an ink jet printer HP850C (Hewlett Packard). After a lined image was printed, the image was allowed to stand, or remain at room temperature for 24 hours prior to evaluation. The optical density of the solid area was measured prior to smear testing using a densitometer (X-Rite 428). The images were printed on several media such as Xerox Courtland 4024DP and Image Series LX paper. An inhouse micro wet smear test fixture was used to smear the image with the use of water wetted chisel tips (similar to highlighter felt tips). The saturated tips was assembled into a mechanical pen. The mechanical pen equipped with the wetted tip was traversed across the image at a force of 80 to 100 grams. This procedure was repeated three times across unsmeared regions of the image. The optical density of the area between the printed lines was measured and averaged over at least ten measurements. The optical density of the background of the media was subtracted from the optical density adjacent to the image.

C) Stability:

50 Grams of ink were placed in a capped bottle and allowed to stand at a temperature of 60° C. for 24 hours. The ink physical properties were measured after heat treatment. For comparison, the shelf standing ink was also measured for physical properties. Large changes greater than 0.3 centipoise units for viscosity indicated instability. Other physical properties, such as surface tension or pH, were monitored, and changes of 3 dynes/cm or a change in pH by more than about 0.5 would indicate instability. Observation of the ink standing on the shelf at room temperature, about 25° C. throughout, for settling was also tested.

D) Optical Density:

An image was printed by an ink jet printer HP855C on each of the following papers: Xerox Courtland 4024DP and Images Series LX. The optical density of the printed image was measured by an X-Rite densitometer.

The ink may be applied to a suitable substrate in image-wise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like. The substrate employed can be any substrate compatible with aqueous-based inks, including plain paper, such as Xerox series 10 paper, Xerox 4024 paper, or the like, coated papers, such as those available from Jujo, transparency materials suitable for aqueous inks or ink jet printing processes, or the like.

The following Examples, Comparative Examples and data are provided.

EXAMPLE I

A resin emulsion comprised of resin particles was derived from 23.6 percent by weight of methacrylic acid, 55.4 percent by weight of benzyl methacrylate, 21.0 percent by weight of polyethyleneglycol methacrylate ($M_w$ =246 grams/mole), and no chain transfer agents.

A one liter kettle equipped with a mechanical stirrer was charged with 240 grams of water, 1.8 grams of sodium dodecylbenzene sulfonate obtained from Rhone-Poulenc as Rhodacal Ds-10, and 2 grams of Triton X-100 (alkylphenoxypolyethanol) available from Aldrich Chemicals, and the mixture was stirred for 2 hours at about 100 revolutions per minute. To this solution were then added 1.8 grams of ammonium persulfate, followed by the addition of an organic mixture containing 28.3 grams of methacrylic acid, 66.5 grams of benzyl methacrylate, and 25.2 grams of polyethyleneglycol methacrylate with a molecular weight of 246 grams per mole. The mixture was then heated to 80° C. for a duration of 6 hours. The resin emulsion product was then cooled to room temperature, and a sample (about 10 grams) was freeze dried and analyzed by GPC to have a number average molecular weight of about 87,800, and a weight average molecular weight of about 35,700 with a polydispersity of 2.46. The sample product contained both resin particles and solubilized resin particles.

EXAMPLE IA

An ink comprised of 4.5 percent by weight of CABOJET 300 carbon black obtained from Cabot Corporation, 20 percent by weight of sulfolane (obtained from Bayer), 0.05 percent by weight of polyethyleneoxide ($M_w$=18,500 grams/mole) (obtained from Polysciences), and 0.55 percent by weight of resin emulsion derived from Example I was prepared by dissolution of the PEO in water through simple agitation using a stir bar for about 5 minutes, followed by the addition of sulfolane and resin emulsion. This mixture was added to a stirring solution of CABOJET 300 carbon black. The ink mixture was stirred with a stir bar for about 5 to about 10 minutes, and the resulting ink mixture was filtered through a 1 gm glass fiber filter.

EXAMPLE II

A resin emulsion comprised of resins was derived from 23.6 percent by weight of methacrylic acid, 55.4 percent by weight of benzyl methacrylate, 21 percent by weight of polyethyleneglycol methacrylate ($M_w$=246 grams/mole), 3 percent by weight of dodecanethiol and 1 percent by weight of carbon tetrabromide.

A one liter kettle equipped with a mechanical stirrer was charged with 240 grams of water, 1.8 grams of sodium dodecylbenzene sulfonate obtained from Rhone-Poulenc as Rhodacal Ds-10, and 2 grams of Triton X-100 (alkylphenoxypolyethanol) available from Aldrich Chemicals, and this mixture was stirred for 2 hours at about 100 revolutions per minute. To this solution were then added 1.8 grams of ammonium persulfate, followed by the addition of an organic mixture containing 28.3 grams of methacrylic acid, 66.5 grams of benzyl methacrylate, 25.2 grams of polyethyleneglycol methacrylate with a molecular weight of 246 grams per mole, 3.6 grams of dodecanethiol and 1.2 grams of carbon tetrabromide. The mixture was then heated to 80° C. for a duration of 6 hours. The resin emulsion was then cooled to room temperature, and a sample (about 10 grams) was freeze dried and analyzed by GPC, and the resin had a number average molecular weight of about 20,580, a weight average molecular weight of about 8,193 with a polydispersity of 2.5.

EXAMPLE IIA

An ink comprised of 4.5 percent by weight of carbon black CABOJET 300 obtained from Cabot, 20 percent by weight of sulfolane (obtained from Bayer), 0.05 percent by weight of polyethyleneoxide ($M_w$=18,500 grams/mole) (obtained from Polysciences), and 1.0 percent by weight of the resin emulsion of Example II was prepared by the dissolution of the PEO in water through simple agitation using a stir bar for about 5 minutes, followed by the addition of sulfolane and resin emulsion. This mixture was added to a stirring solution of the CABOJET 300 carbon black. The resulting ink mixture was stirred with a stir bar for about 5 to about 10 minutes. The resulting ink mixture was filtered through a 1 µm glass fiber filter. The ink was jetted out of a Xerox 600 dpi hardware and this ink exhibited a latency of 20 seconds.

EXAMPLE IIB

An ink comprised of 3 percent by weight of carbon black CABOJET 300 obtained from Cabot, 22 percent by weight of sulfolane (obtained from Bayer), 6 percent by weight of 2-pyrrolidinone (obtained form Aldrich), 0.05 percent by weight of polyethyleneoxide ($M_w$=18,500 grams/mole) (obtained from Polysciences), and 1 percent by weight of solids derived from Example II resin emulsion was prepared by the dissolution of the PEO in water through simple agitation using a stir bar for about 5 minutes, followed by the addition of sulfolane, 2-pyrrolidinone, and resin emulsion. This mixture was added to a stirring solution of the CABOJET 300 carbon black. The ink mixture was stirred with a stir bar for about 5 to about 10 minutes. The resulting ink mixture was filtered through a 1 µm glass fiber filter. The ink was jetted from a Xerox 600 dpi hardware, and this ink exhibited a latency of 45 seconds.

EXAMPLE III

A resin emulsion comprised of resins derived from 23.6 percent by weight of methacrylic acid, 55.4 percent by weight of benzyl methacrylate, 21 percent by weight of polyethyleneglycol methacrylate ($M_w$=246 grams/mole), 5 percent by weight of dodecanethiol and 1 percent by weight of carbon tetrabromide was prepared.

A one liter kettle equipped with a mechanical stirrer was charged with 240 grams of water, 1.8 grams of sodium dodecylbenzene sulfonate obtained from Rhone-Poulenc as Rhodacal Ds-10, and 2 grams of Triton X-100

(alkylphenoxypolyethanol) available from Aldrich Chemicals, and the resulting mixture was stirred for 2 hours at about 100 revolutions per minute. To this solution, was then added 1.8 grams of ammonium persulfate followed by the addition of an organic mixture containing 28.3 grams of methacrylic acid, 66.5 grams of benzyl methacrylate, 25.2 grams of polyethyleneglycol methacrylate with a molecular weight of 246 grams per mole, 6.2 grams of dodecanethiol and 1.2 grams of carbon tetrabromide. The mixture was then heated to 80° C. for a duration of 6 hours. The resin emulsion product was then cooled to room temperature, and a sample (about 10 grams) was freeze dried and analyzed by GPC, and the resin possessed a number average molecular 11,950, a weight average molecular weight of about 4,500 with a polydispersity of 2.6.

EXAMPLE IIIA

An ink comprised of 4.5 percent by weight of carbon black CABOJET 300 obtained from Cabot, 20 percent by weight of sulfolane (obtained from Bayer), 0.05 percent by weight of polyethyleneoxide ($M_w$=18,500 grams/mole) (obtained from Polysciences), and 0.55 percent by weight of latex derived from Example III was prepared by dissolution of the PEO in water through simple agitation using a stir bar for about 5 minutes, followed by the addition of sulfolane and resin emulsion. This mixture was added to a stirring solution of the CABOJET 300 carbon black. The ink mixture was stirred with a stir bar for about 5 to about 10 minutes. The resulting ink mixture was filtered through a 1 µm glass fiber filter.

EXAMPLE IV

A latex resin emulsion comprised of resins derived from 12 percent by weight of methacrylic acid, 78 percent by weight of butyl methacrylate, 10 percent by weight of glycidyl methacrylate, 2 percent by weight of dodecanethiol and 2 percent by weight of carbon tetrabromide was prepared.

A 500 milliliter jacketed glass flask equipped with a mechanical stirrer, 1.2 grams of ammonium persulfate, 2 grams of sodium dodecylbenzene sulfonate obtained from Rhone-Poulenc as Rhodacal Ds-10, 2 grams of Triton X-100 (alkylphenoxypolyethanol) available from Union Carbide, and 320 grams of deionized water were deaerated for 30 minutes. A monomer mixture of 9.6 grams of methacrylic acid, 62.4 grams of butyl methacrylate, 8 grams of glycidyl methacrylate, 1.6 grams of dodecanethiol and 1.6 grams of carbon tetrabromide was charged into the flask and was emulsified for 10 minutes at room temperature. This emulsion was then polymerized at 70° C. for 5.5 hours in a nitrogen atmosphere. The resin emulsion product was then cooled to room temperature, and a sample (about 10 grams) was freeze dried and analyzed by GPC to have a weight average molecular weight of 36,000. The solids content of the reaction yielded 21.2 percent solids with an average particle size of 115 nanometers and a glass transition temperature of 41° C.

EXAMPLE IVA

An ink comprised of 4 percent by weight of carbon black CABOJET 300 obtained from Cabot, 23.2 percent by weight of sulfolane (obtained from Bayer), 6 weight percent of 2-pyrrolidinone, 0.05 percent by weight of polyethyleneoxide ($M_w$=18,500 g/mole) (obtained from Polysciences), and 1 percent by weight of resin emulsion derived from Example IV was obtained by the dissolution of the PEO in water through simple agitation using a stir bar for about 5 minutes, followed by the addition of sulfolane and 2-pyrrolidinone and resin emulsion. This mixture was added to a stirring solution of the CABOJET 300 carbon black. The ink mixture was stirred with a stir bar for about 5 to about 10 minutes. The resulting ink mixture was filtered through a 1 µm glass fiber filter.

EXAMPLE V

A latex resin emulsion comprised of resins derived from 24 percent by weight of methacrylic acid, 76 percent by weight of butyl methacrylate, 2 percent by weight of dodecanethiol and 1 percent by weight of carbon tetrabromide.

A 500 milliliter jacketed glass flask equipped with a mechanical stirrer, 1.8 grams of ammonium persulfate, 1.78 grams of sodium dodecylbenzene sulfonate obtained from Rhone-Poulenc as Rhodacal Ds-10, and 1.78 grams of Triton X-100 (alkylphenoxypolyethanol) available from Union Carbide, and 232 grams of deionized water were deaerated for 30 minutes. A monomer mixture of 91.2 grams of styrene, 28.8 grams of methacrylic acid, 2.4 grams of dodecanethiol and 1.2 grams of carbon tetrabromide was charged into the flask and was emulsified for 10 minutes at room temperature. This emulsion was then polymerized at 80° C. for 5.5 hours in a nitrogen atmosphere. The solids content of the reaction yielded 37.4 percent solids with an average particle size of 112 nanometers.

EXAMPLE VA

An ink comprised of 4 percent by weight of carbon black CABOJET 300 obtained from Cabot, 21 percent by weight of sulfolane (obtained from Bayer), 4.8 weight percent of tripropylene glycol monomethyl ether (obtained from Dow Chemicals), 0.05 percent by weight of polyethyleneoxide ($M_w$=18,500 g/mole) (obtained from Polysciences), and 1 percent by weight of resin emulsion derived from Example V was obtained by the dissolution of the PEO in water through simple agitation using a stir bar for about 5 minutes, followed by the addition of sulfolane and tripropylene glycol monomethyl ether and resin emulsion. This mixture was added to a stirring solution of the CABOJET 300 carbon black. The ink mixture was stirred with a stir bar for about 5 to about 10 minutes. The resulting ink mixture was filtered through a 1 µm glass fiber filter.

Comparative Example 1

An ink comprised of 4.5 percent by weight of carbon black CABOJET 300 obtained from Cabot, 20 percent by weight of sulfolane (obtained from Bayer), 0.05 percent by weight of polyethyleneoxide ($M_w$=18,500 grams/mole) (obtained from Polysciences) was prepared by dissolution of the PEO in water through simple agitation using a stir bar for about 5 minutes, followed by the addition of sulfolane. This mixture was added to a stirring solution of the CABOJET 300 carbon black. The ink mixture was stirred with a stir bar for about 5 to about 10 minutes. The resulting ink mixture was filtered through a 1 µm glass fiber filter.

Comparative Example 2

An ink comprised of 3 percent by weight of carbon black CABOJET 300 obtained from Cabot, 22 percent by weight of sulfolane (obtained from Bayer), 6 percent by weight of 2-pyrrolidinone, 0.05 percent by weight of polyethyleneoxide ($M_w$=18,500 grams/mole) (obtained from Polysciences) was prepared by dissolution of the PEO in water through simple agitation using a stir bar for about 5 minutes, followed by the addition of sulfolane. This mixture was added to a stirring solution of the CABOJET 300 carbon black. The ink mixture was stirred with a stir bar for about 5 to about 10 minutes. The resulting ink mixture was filtered through a 1 µm glass fiber filter. The ink was jetted using a Xerox 600 dpi hardware and this ink exhibited a latency of 5 seconds.

Physical Properties of the Inks and Stability Testing Measured at 25° C.

| Example | Viscosity cPs | Surface Tension D/cm | pH | 60° C./24 Hour Heat Treatment | | |
|---|---|---|---|---|---|---|
| | | | | Viscosity cPs | Surface Tension D/cm | pH |
| IA | 2.25 | 49 | 7.00 | 2.30 | 49 | 7.00 |
| IIA | 1.70 | 42 | 6.52 | 1.66 | 42 | 6.53 |
| IIIA | 1.82 | 43 | 6.74 | 1.76 | 43 | 6.74 |
| IVA | 2.23 | 36 | 6.79 | 2.20 | 36 | 6.72 |
| VA | 2.30 | 44 | 7.10 | 2.20 | 44 | 7.00 |
| Comparative 1 | 2.21 | 59 | 7.70 | 2.30 | 59 | 7.30 |
| IIB | 2.11 | 42 | 6.71 | 2.11 | 42 | 6.76 |
| Comparative 2 | 2.19 | 53 | 8.17 | 2.23 | 53 | — |

—indicates not measured

In the above Examples, the inks exhibit good stability at room temperature and also when subjected to heat treatment. The Examples did not appear to be affected by the addition of resin emulsion in the context of instability due to heat treatment or upon standing. All inks are shelf stable with no evidence of settling or precipitates for at least 8 months at about 25° C.

Optical Density and Smear Attributes

| Example | Optical Density | | Smear OD | |
|---|---|---|---|---|
| | Xerox 4024DP | Image Series LX | Xerox 4024DP | Image Series LX |
| IA | 1.49 | 1.53 | 0.11 | 0.10 |
| IIA | 1.47 | 1.53 | 0.08 | 0.12 |
| IIIA | 1.48 | 1.53 | 0.06 | 0.12 |
| IVA | 1.54 | 1.57 | 0.07 | 0.08 |
| VA | 1.47 | 1.58 | 0.07 | 0.10 |
| Comparative 1 | 1.40 | 1.45 | 0.13 | 0.14 |
| IIB | 1.46 | 1.50 | 0.06 | 0.03 |
| Comparative 2 | 1.30 | 1.32 | 0.12 | 0.14 |

The inks of the invention Examples exhibited high optical density as compared to the corresponding Comparative Examples. The smear resistance is evident in the reduction in smear optical density.

Wet Smear Resistance Optical Density

| Example | Image Series LX |
|---|---|
| IIB | 0.12 |
| Comparative 2 | 0.22 |

The wet smear resistance is significantly improved through the use of the resin emulsions.

Other embodiments and modifications of the present invention may occur to those skilled in the art subsequent to a review of the information presented herein; these embodiments and modifications, as well as equivalents thereof, are also included within the scope of this invention.

What is claimed is:

1. An ink comprised of a liquid vehicle, colorant, and resin emulsion, and wherein the resin emulsion contains water, surfactant, first resin particles and second solubilized resin obtained from the polymerization of a mixture of olefinic monomers, and wherein at least one of the olefinic monomers is an acid.

2. An ink in accordance with claim 1 wherein the colorant is a pigment.

3. An ink in accordance with claim 2 wherein the mixture of olefinic monomers is comprised of alkyl acrylate, alkyl methacrylate, benzyl methacrylate, polyoxyalkylene acrylate, or polyoxyalkylene methacrylate.

4. An ink in accordance with claim 1 wherein said acid olefinic monomer is methacrylic acid, sodium acrylate, potassium acrylate, sodium methacrylate, or potassium methacrylate acrylate.

5. An ink in accordance with claim 3 wherein the alkyl acrylate or alkyl methacrylate is methyl acrylate, methyl methacrylate, ethyl acrylate, ethyl methacrylate, propyl acrylate, propyl methacrylate, butyl acrylate, butyl methacrylate, hexyl acrylate, hexyl methacrylate, pentyl acrylate, pentyl methacrylate, heptyl acrylate, heptyl methacrylate, octyl acrylate, octyl methacrylate, nonyl acrylate, nonyl methacrylate, decyl acrylate, decyl methacrylate, lauryl acrylate, lauryl methacrylate, stearyl acrylate, stearyl methacrylate, dodecyl acrylate, or dodecyl methacrylate.

6. An ink in accordance with claim 3 wherein the polyoxyalkylene acrylate or methacrylate is of the formula

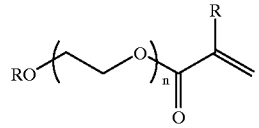

wherein R is hydrogen, or alkyl with from about 1 to about 6 carbon atoms, and n is a number of from about 2 to about 100.

7. An ink in accordance with claim 1 wherein said resin particles possess an $M_w$ of from about 1,500 to about 50,000 grams per mole, and wherein said resin particles possess an $M_n$ of from about 1,000 to about 15,000 grams per mole.

8. An ink in accordance with claim 1 further containing an ink additive.

9. An ink in accordance with claim 8 wherein the ink additive is a surfactant.

10. An ink in accordance with claim 9 wherein the surfactant is sodium dodecylbenzene sulfonate, polyethylene oxide, polyethylene oxide nonyl phenyl ether, tetraalkyl ammonium chloride, or sodium naphthalene sulfonate selected in an amount of from about 0.005 to about 20 weight percent of the resin.

11. An ink in accordance with claim 2 wherein said pigment is present in an amount of from about 2.5 to about 10 percent by weight of said ink composition.

12. An ink in accordance with claim 2 wherein said pigment is carbon black, cyan, magenta, yellow, or mixtures thereof.

13. An ink in accordance with claim 2 with a latency of from about 20 to about 60 seconds.

14. An ink in accordance with claim 1 further containing biocide and humectant.

15. An ink in accordance with claim 14 wherein the biocide is present in an amount of from about 0.01 to about 5 weight percent of the ink, and wherein the humectant is present in an amount of from about 0.01 to about 35 weight percent of the ink solids.

16. An ink in accordance with claim 1 wherein from 1 to about 5 olefinic monomers are selected.

17. An ink in accordance with claim 1 wherein said resin emulsion contains from about 60 to about 99 weight percent of said first resin particles and from about 2 to about 40 weight percent of said second solubilized resin.

18. An ink in accordance with claim 17 wherein the average diameter of said resin particles is from about 30 nanometers to about 300 nanometers.

19. An ink in accordance with claim 8 wherein the ink additive is a polymeric additive.

20. An ink in accordance with claim 1 wherein said resin emulsion is generated from methacrylic acid, benzyl methacrylate, and polyethyleneglycol methacrylate.

21. An ink in accordance with claim 1 wherein said colorant is a pigment or a dye.

22. An ink comprised of a vehicle, colorant, and resin emulsion, and wherein the resin emulsion contains water, surfactant, first resin particles and second solubilized resin obtained from the polymerization of a mixture of olefinic monomers, and wherein at least one of the olefinic monomers is an acid, and wherein said resin emulsion is comprised of from about 60 to about 99 weight percent of resin particles and from about 2 to about 40 weight percent of solubilized resin.

23. An ink composition in accordance with claim 22 wherein the vehicle is water or a mixture of water and a miscible organic component.

24. An ink comprised of a liquid vehicle, colorant, and a resin emulsion comprised of first resin particles and second solubilized resin generated from the polymerization of an olefinic acid and an olefinic methacrylate.

25. An ink in accordance with claim 24 wherein said resin particles are present in an amount of from about 60 to about 99 weight percent.

26. An ink in accordance with claim 24 wherein said second solubilized resin is present in an amount of from about 2 to about 40 weight percent.

27. An ink in accordance with claim 24 wherein said resin emulsion possesses an average diameter of from about 30 nanometers to about 300 nanometers.

28. An ink in accordance with claim 24 wherein the first resin particles are present in an amount of from about 90 to about 97 weight percent, and the second solubilized resin is present in an amount of from about 3 to about 10 weight percent.

29. An ink in accordance with claim 24 further containing a polymeric additive.

30. An ink in accordance with claim 24 wherein said resin emulsion is comprised of resins generated from methacrylic acid, benzyl methacrylate, and polyethyleneglycol methacrylate.

31. An ink comprised of a liquid vehicle, colorant, and resin emulsion, and wherein the resin emulsion contains water, surfactant, first resin particles and second solubilized resin obtained from the polymerization of a mixture of olefinic monomers, and wherein at least one of the olefinic monomers is an acid, and wherein said first resin particles are dissimilar than said second solubilized resin.

* * * * *